United States Patent [19]
Yamamoto

[11] Patent Number: 5,314,380
[45] Date of Patent: May 24, 1994

[54] STRUCTURE OF UNIVERSAL JOINT
[75] Inventor: Yoshimi Yamamoto, Shizuoka, Japan
[73] Assignee: Fuji Kiko Company, Ltd., Japan
[21] Appl. No.: 14,009
[22] Filed: Feb. 5, 1993

Related U.S. Application Data

[63] Continuation of Ser. No. 598,939, Oct. 17, 1990, abandoned.

[30] Foreign Application Priority Data

Oct. 23, 1989 [JP] Japan ............................ 1-123743[U]

[51] Int. Cl.⁵ .......................... F16C 1/24; F16D 3/40
[52] U.S. Cl. ...................................... 464/11; 464/128; 464/136
[58] Field of Search ............... 464/11, 14, 128–133, 464/136; 384/127, 420, 425

[56] References Cited

U.S. PATENT DOCUMENTS

| Re. 27,068 | 2/1971 | Groves et al. | 464/162 |
| 3,600,969 | 8/1971 | Pitner | 464/131 X |
| 3,635,535 | 1/1972 | Schultenkamper | 464/14 X |
| 3,950,834 | 4/1976 | Pitner | 464/128 X |
| 4,050,130 | 9/1977 | Pitner | 464/128 X |
| 4,371,357 | 2/1983 | Petrzelka et al. | 464/128 |
| 4,436,516 | 3/1984 | Olschewski et al. | 464/128 |
| 4,540,386 | 9/1985 | Kämpf | 464/130 |
| 4,611,932 | 9/1986 | Olschewski et al. | 464/131 X |
| 4,637,740 | 1/1987 | Olshewski et al. | 384/425 |

FOREIGN PATENT DOCUMENTS

| 2120569 | 11/1972 | Fed. Rep. of Germany . |
| 1202002 | 1/1960 | France . |
| 2489906 | 3/1982 | France . |

Primary Examiner—Daniel P. Stodola
Assistant Examiner—Eileen A. Dunn
Attorney, Agent, or Firm—Ronald P. Kananen

[57] ABSTRACT

A structure of a universal joint is disclosed in which an end surface of a spider is coated with a solid lubricant and a projection having an arc cross section formed on a center of a bearing cup into which the spider is fitted is brought into point contact with the solid lubricant coated end surface of the spider. When the spider is axially rotated, the friction generated on the bearing cup can be remarkably reduced.

7 Claims, 2 Drawing Sheets

STRUCTURE OF UNIVERSAL JOINT

This application is a continuation of application Ser. No. 07/598,939 filed Oct. 17, 1990, now abandoned.

BACKGROUND OF THE INVENTION

(1) Field of the Invention

The present invention relates to a structure of a universal joint applicable to a steering system of an automotive vehicle.

(2) Background of the Art

A universal joint is a joint used to link a pair of shafts at predetermined a angle and to transmit rotational torque from one shaft to the other, used, for example, in a steering system of an automotive vehicle.

An automotive steering system includes a steering shaft rotatably supported at a predetermined tilt angle in a vehicle compartment, a steering gear box disposed at a front portion of the vehicle body, and a universal joint with a low frictional coefficient intervened between intermediate shafts.

The universal joint includes a pair of yoke portions which face each other and rotatably link the intermediate shafts via a trunnion.

A link portion of the universal joint linking the pair of yoke portions and trunnion includes a hole penetrated into the pair of yoke portions, a bearing cup fitted into the hole, a spider of the trunnion intervened with a needle bearing and inserted into the bearing cup, and a seal ring which houses a lubricant and is closely contacted against the bearing cup and trunnion. A circular projection having a predetermined area is projected from the outside of the center of the bearing cup toward its inside. A rough surface having a convex portion and a recessed portion is formed on the projection. The rough surface is contacted against an end surface of the spider with a lubricant such as grease intervened on the rough surface of the projection. A stopper is formed on the pair of yokes and fixed to the bearing cup. Thus, swing torque (friction) between the trunnion and yokes can relatively be reduced.

However, in the previously proposed structure of a universal joint described above, trouble occurs such that steering force is heavy making a steering wheel difficult to return to an original state when applied to a vehicle in which an auxiliary output such as a hydraulic system is used to relieve the steering force, i.e., a so-called power-assisted steering system.

This is because the swing torque between the trunnion and the pair of yoke portions is relatively large. Hence, more improvement is required for the universal joint structure.

SUMMARY OF THE INVENTION

It is an object of the present invention to provide an improved structure of a universal joint in which swing torque can be reduced, with a high quality sealing characteristic, requiring little structural modification and offering high reliability.

The above-described and other objects can be achieved by providing a universal joint structure, comprising: a) a pair of yoke portions facing each other; b) a trunnion linking the pair of yoke portions to each other so as to enable flexing of both yoke portions, the trunnion having a spider; c) a lubricant coated on an end surface of the spider; and d) a bearing cup having a projection of an arc-shaped cross section at the center portion thereof the bearing cup being inserted between the surface of the spider and the inner wall of the one yoke portion and the projection thereof being contacted against the lubricant of the end surface of the spider in a point-to-point contact.

The above-described object can also be achieved by providing a universal joint structure comprising: a) a pair of yoke portions facing each other; b) a trunnion linking the pair of yoke portions to each other so as to enable flexing of both yoke portions, the trunnion having a spider; c) a lubricant coated on an end surface of the spider; and d) a bearing cup having a projection of a part in point contact with the end surface of the spider at a center portion thereof, the bearing cup being inserted between the end surface of the spider and inner wall of the one yoke portion and the projection thereof being contacted against the lubricant of the end surface of the spider in a point-to-point contact.

DETAILED DESCRIPTION OF THE PREFERRED EMBODIMENT

Reference will hereinafter be made to the drawings in order to facilitate a better understanding of the present invention.

Figure 1:
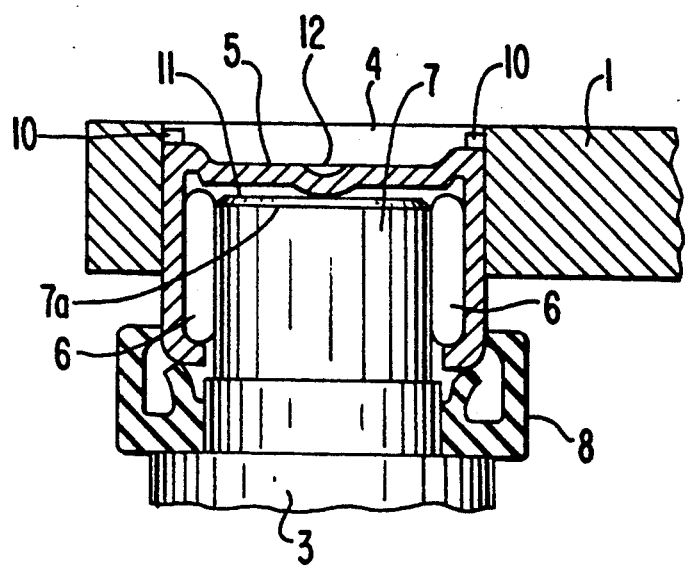
FIG. 1 is a cross sectional view of an essential portion of an universal joint in a preferred embodiment according to the present invention.
Figure 2:
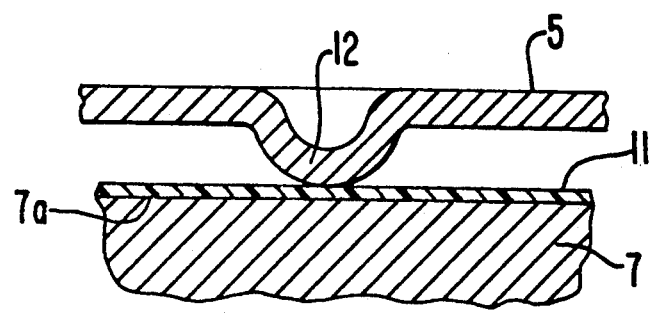
FIG. 2 is a partially enlarged view of the essential portion shown in FIG. 1.
Figure 3:
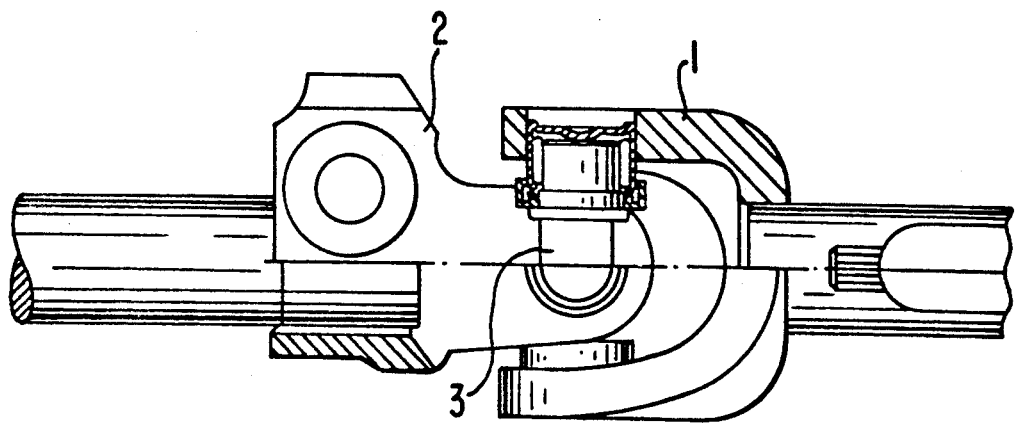
FIG. 3 is a partially cross sectioned view of the universal joint and a peripheral vehicle part.

FIG. 1 shows a cross sectional view of a linking portion between the pair of yoke portions and trunnion in an universal joint according to the present invention. FIG. 2 shows a partially expanded view of FIG. 1. In FIG. 3 numerals 1 and 2 denote a pair of yoke portions of the universal joint and 3 denotes a trunnion. In FIG. 1 numeral 4 denotes a hole into which a bearing cup 5 is fitted. The hole 4 is provided in the pair of yoke portions 1 and 2. A spider 7 of the trunnion 3 is inserted into the bearing cup 5 and supported laterally by needle bearings 6. Grease is housed in a seal ring 8. The seal ring 8 is fitted to the trunnion 3 and closely contacted against the bearing cup 5 and the trunnion 3. An end surface 7a of the spider 7 is coated with a solid lubricant 11 such as a fluoride series resin, i.e., Molybdenum disulfide or Teflon. On the other hand, a projection 12 having an arc cross section is formed on a center of the bearing cup 5 so as to project toward an internal side of the end surface 7a so that the projection 12 is contacted against the solid lubricant 11. The bearing cup 5 is restricted so as to prevent it from 'popping out' by means of the stopper 10.

When the spider 7 is rotated, the swing torque generated with the bearing cup 5 on a contact portion can be expressed as $T = F \times \mu \times l$, wherein F denotes a predetermined synthetic force for the pair of yoke portions 1 and 2 to push the bearing cup 5, $\mu$ denotes a frictional coefficient, and l denotes a contact area (radius) between the projection 12 and the end surface of the spider 7. In the preferred embodiment, $T = F \times \mu$. That is to say, the projection 12 is brought in point contact with the spider 7 and the end surface 7a is coated with the solid lubricant 11. Therefore, the symbol l expressed in the above equation is substantially equal to 1. The circular projection in the previously proposed universal joint is formed by a predetermined radius (e.g., 1.75 mm) from its center and the end surface is rough.

As described hereinabove, since in the universal joint according to the present invention the solid lubricant is coated on the end surface of the spider and the projection having the arc cross section is formed on the bearing cup into which the spider is fitted, the projection being contacted against the end surface of the spider, the swing torque of the universal joint can remarkably be reduced. Therefore, the operativity of the power steering system can be improved and the feel of the steering operation can also be improved.

It will fully be appreciated by those skilled in the art that the foregoing description is made in terms of the preferred embodiment and various changes and modification may be made without departing from the scope of the present invention which is to be defined by the appended claims.

What is claimed is:

1. A universal joint structure, comprising:
   (a) a pair of yoke portions facing each other;
   (b) a trunnion linking the pair of yoke portions to each other so as to enable mutual tilting of both yoke portions, the trunnion having a spider;
   (c) a wholly flat end surface of the spider having a solid lubricant coating affixed thereto; and
   (d) a bearing cup having a projection with an arc-shaped engagement portion at a center portion thereof, the bearing cup being inserted operatively between said flat end surface of the spider and an inner wall of a respective one of the yoke portions, and the arc-shaped engagement portion of said projection being contacted against the solid lubricant coating of the flat end surface of the spider in a point-to-point contact.

2. A universal joint structure as set forth in claim 1, wherein the lubricant is a solid lubricant of a fluoride series resin.

3. A universal joint structure as set forth in claim 1, wherein a hole is provided on one of the pair of yoke portions and the bearing cup is inserted into the hole.

4. A universal joint structure as set forth in claim 3, wherein a needle bearing is provided between the bearing cup and spider.

5. A universal joint structure, comprising:
   (a) a pair of yoke portions facing each other;
   (b) a trunnion linking the pair of yoke portions to each other so as to enable mutual angular displacement of both yoke portions, the trunnion having a spider;
   (c) a wholly flat end surface of the spider having a solid lubricant coating affixed thereto; and
   (d) a bearing cup having a projection with an arc-shaped engagement surface for contacting with said end surface of the spider at a center portion thereof, the bearing cup being inserted operatively between the flat end surface of the spider and an inner wall of a respective one of the yoke portions and the arc-shaped engagement surface of said projection being contacted against the solid lubricant coating of the flat end surface of the spider always in a point-to-point contact.

6. A structure of an universal joint as set forth in claim 5, wherein the yoke portions and trunnion form part of a vehicular steering system.

7. A universal joint yoke structure comprising:
   a) a pair of yoke portions facing each other; and
   b) a trunnion linking the pair of yoke portions to each other so as to enable mutual angular displacement of both yoke portions;
   said trunnion being linked to a cylindrical spider fitted into a hole defined by at least one of said pair of yoke portions, said trunnion being interposed with a bearing and a bearing cup;
   said spider having a free end surface opposing to said bearing cup, said free end surface being wholly flat and wholly covered with a solid lubricant coating affixed thereto, said bearing cup having a projection having an arc-shaped engagement surface projected toward said free end surface of the spider, and said solid lubricant coating of said end surface of the spider being contacted with the engagement surface of said projection of the bearing cup in a single point-to-point contact form.

* * * * *